3,336,149
METHOD OF FLOCK PRINTING UTILIZING AS AN ADHESIVE A SOLVENT SOLUTION OF A COPOLYMER OF ACRYLONITRILE, ALKYL ESTER, AND A CROSSLINKING COMONOMER AND FLOCKED FABRIC
Leonard J. Fox, Berkeley Heights, Henry Stanley, Newark, and Samuel Gold, Berkeley Heights, N.J., assignors to National Starch and Chemical Corporation, New York, N.Y., a corporation of Delaware
No Drawing. Filed Sept. 25, 1963, Ser. No. 311,322
3 Claims. (Cl. 117—25)

This invention relates to the preparation of flocked articles, and more particularly, to the adhesive compositions utilized in preparing such flocked articles.

Flock printing processes are commonly employed for the preparation of fabrics which are used in the manufacture of hats, shoes, dresses, ribbons, rugs, carpets, and similar articles. In these flock printing methods, short fibers are deposited on a fabric, usually in a definite pattern, and are held fast to the fabric by means of a suitable adhesive. The variety of attractive patterns, as well as the soft hand or touch, obtained through flock printing makes this technique an ideal means of preparing decorative fabrics.

The success of flock printing techniques is, to a great extent, dependent upon the adhesives used therein to adhere the flock fibers to the fabric. Adhesives formerly used for flock printing have exhibited a number of shortcomings. Thus, for example, plasticized nitrocellulose lacquers, which have been used as flock binders, have low flash points, thereby making them hazardous to work with and unsuitable for use on garments. Rubber cements have also been proposed as binders, but such cements impart poor color to fabrics and require lengthy curing cycles. In addition, rubber cements are often sensitive to dry cleaning solvents. Various other materials which have been employed as flock printing binders have generally proved unsatisfactory with respect to their sensitivity to washing, dry cleaning, and abrasion.

It is an object of this invention to prepared adhesive compositions for flock printing, said adhesive compositions having extremely high wash, dry clean, and abrasion resistance. Another object of this invention is to prepare flock printing adhesive compositions which require minimal curing cycles. A further object of this invention is the preparation of flocked fabrics which possess a soft hand or feel. Other objects and the advantages of this invention will be apparent from the discussion that appears hereinafter.

In accordance with the invention, copolymers of alkyl esters of acrylic acid with certain comonomers, hereinafter defined, are advantageously used as flock binders in flock printing methods. The use of these binder systems in the flock printing process imparts soft hand, along with outstanding wash, abrasion, and dry clean resistance to the resulting fabrics. Our novel flock printing adhesives are particularly noteworthy in that they impart abrasion resistance, not only to dry patterns, but also to patterns wet with water or organic solvents. A further interesting property of these copolymers is their ability to cure at room temperature. It should be noted that in connection with adhesives for flock printing, the terms "adhesives" and "binders" are used interchangeably, and are synonymous.

The copolymers which are used in preparing the flock printing adhesives of this invention should contain from 55 to 90%, by weight, of an alkyl ester of acrylic acid wherein said alkyl group may contain from 1 to 8 carbon atoms; from 5 to 40%, by weight, of acrylonitrile; and, from 0.5 to 10.0%, by weight, of a crosslinking comonomer, the total, of course, being 100%. Of particular utility as the aforementioned crosslinking comonomer, there may be listed N-methylol acrylamide, N-methylol methacrylamide, glycidyl acrylate, glycidyl methacrylate, and the like.

The copolymers which comprise the base for our novel flock printing binders may be prepared by any suitable polymerization method. Usually the polymerization is carried out in an organic solvent medium by heating the mixture of comonomers at the reflux temperature of the solvent, thus insuring a constant temperature and dissipation of the heat of reaction in evaporating the solvent. Solvent soluble free radical initiating catalysts of the peroxide or azo type are utilized in these polymerizations. If the resulting polymer is insoluble in the solvent, it can be filtered, washed, and thereafter dissolved in a solvent in which it is soluble. The copolymers can be utilized in the form of the lacquers wherein they were prepared, or these lacquers, in turn, may be converted to aqueous emulsions prior to their use in the flock printing process. Thus, lacquers of these copolymers may be readily emulsified by adding an aqueous solution of an emulsifier, such as polyvinyl alcohol, morpholine-oleic acid mixtures, and the like, to the lacquer while the lacquer is being vigorously agitated. The organic solvent is then removed from the mixture by flash distillation or any other suitable method. The polymerization may also be carried out by dispersing the comonomers as fine droplets in a large volume of water through the use of emulsifying agents. Then the polymerization is effected in the presence of water soluble catalysts, such as, for example, the persulfates. At any rate, the total solids content of the formulations may range from about 30% to about 65%, by weight.

It should be noted that neither the copolymers described herein nor the methods whereby they are prepared constitute the novel aspect of this invention. Rather, it is the use of said copolymers in flock printing and the surprisingly advantageous results of such use which comprise the particular concept of this invention.

In addition to the copolymers described previously, the flock printing adhesives of this invention may also include such other ingredients as inert fillers, pigments, catalytic agents, antioxidants, ultra violet stabilizers, diluents, thermosetting resins, plasticizers, and any similar additive with which the practitioner may wish to modify the properties of the formulation.

The adhesive formulations used in the process of this invention are applicable to any of the conventional flock printing techniques. In these techniques, the adhesive formulation is ordinarily deposited by any suitable means onto the surface of a fabric substrate which is carried on a moving belt or roll. The adhesive is usually applied to the fabric by means of a spray gun, perforated screens, or engraved rollers so as to form, if desired, a definite pattern or design. Thereafter, an excess of fiber flock is deposited onto the adhesive coated fabric and the fabric is then carried to a drying oven wherein the drying or curing of the adhesive is effected. After curing, the fabric is run through a brushing and vacuum machine which serves to remove the loose fibers that are not part of the desired pattern.

As was mentioned previously, the copolymers used in our flock printing process may be applied either as lacquers or as aqueous emulsions. These adhesives are usually applied in a wet coating thickness of from about 1 mil to about 25 mils. In addition, the adhesive compositions used in this invention are readily adaptable to both vibration and electrostatic methods of flock printing.

The drying cycles employed to cure the adhesive coated fabric may be varied according to the particular needs of the practitioner. Optimum results are obtained by exposing the flocked fabric to temperatures of about 300° F. for from 3 to 5 minutes. Despite this relatively short curing time, flocked fabrics embodying our adhesives nevertheless attain extremely high wash and solvent resistant properties. A comparable degree of wash and solvent resistance could be achieved by adhesives heretofore utilized only by maintaining higher temperatures for considerably longer periods of time. Furthermore, the adhesive compositions used in this invention possess the particular advantage that they can be cured at room temperature in about 30 minutes, without any heating cycle. However, in order to effect room temperature curing, it is desirable to add to the formulation approximately 0.25%, by weight of the copolymer solids, of a suitable catalyst. Such catalysts include aryl sulfonic acids, alkyl sulfonic acids, aryl phosphonic acids, alkyl phosphonic acids, trihalo acetic acids, poly nitrobenzoic acids, poly nitrophenols, alkyl esters of aryl sulfonic acids, mineral acids, alkyl esters of sulfuric acid, and similar compounds. These catalysts may also be included, if desired, in those compositions of our invention which are to be cured at elevated temperatures.

The flock fibers used in the process of this invention may be selected from any natural or synthetic fibers or any combination of natural and synthetic fibers. These fibers can be such natural fibers as cotton, wool, silk, and the like, or such synthetic fibers as rayon, polyamide, polyester, acetate, acrylic, and the like. The length and diameter of the fibers which are used are not critical to the invention. The deniers of the fibers may be varied along with the lengths, and various textures of different types of flock fibers may be blended.

It can be seen, therefore, that the adhesive compositions of this invention imbue the flock printing process with a number of significant advantages. Thus, these adhesives show high wash, dry clean, and abrasion resistance without sacrificing the soft hand which is necessary for commercial acceptability. Also of obvious commercial importance is the ability of these adhesives to cure very rapidly at elevated temperatures, or even at room temperature if so desired.

In the following examples, which further illustrate the embodiment of this invention, all parts given are by weight, unless otherwise indicated.

*Example I*

This example illustrates the preparation of the adhesive compositions of this invention and their subsequent use in a flock printing process.

In this example and in the examples that follow, the same procedures were utilized to test the wash, dry clean, and abrasion characteristics of the flocked fabrics.

In testing wash resistance, the flocked and cured fabric was subjected to an ordinary washing in a typical household washing machine. Any change in "hand" or loss of flocked fibers was considered detrimental.

In testing dry clean resistance, the flocked and cured fabric was placed in a container filled with perchloroethylene (a dry cleaning solvent) and steel balls and was then tumbled at 170° F. for 15 minutes. Any change in "hand" or loss of flocked fibers was considered detrimental.

In testing solvent abrasion resistance, the flocked and cured fabric was soaked in perchloroethylene and abraded by rubbing the surface of the fabric with the fingernail. Any loss of flocked fibers due to the abrasion was considered detrimental.

(a) A reaction vessel fitted with a water-cooled condenser, stirrer and gas inlet tube was charged with a mixture of the following ingredients:

| Component: | Parts |
| --- | --- |
| Acrylonitrile | 125 |
| Butyl acrylate | 375 |
| Toluene | 213 |
| Methyl alcohol | 61 |
| N-methylol acrylamide (40% solids in isopropyl alcohol) | 50 |
| Isopropyl alcohol | 51 |
| Benzoyl peroxide | 3.75 |

The mixture was then heated, with stirring, to about 167° F. while a stream of nitrogen was slowly bubbled through the solution. Heating was continued for 9 hours whereupon the reaction mixture was cooled and discharged from the reaction vessel.

The copolymer lacquer thus prepared was deposited upon a fabric substrate carried on a conveyor blanket, in a wet coat thickness of 15 mils. Rayon fibers 0.05 inch in length and 1.5 denier in diameter were then flocked upon the wet adhesive layer with constant agitation due to the action of beater bars upon the conveyor blanket. The wet flocked fabric was then passed into a hot air oven wherein it was heated at a temperature of 300° F. for about 5 minutes. The resulting flocked fabric, when subjected to the tests heretofore described, exhibited properties of wash, dry clean, and abrasion resistance which were superior to the properties exhibited by flocked fabrics employing conventional flocking adhesives.

(b) An aqueous emulsion having the following composition:

| Component: | Parts |
| --- | --- |
| Acryonitrile | 25 |
| Butyl acrylate | 75 |
| N-methylol acrylamide | 4 |
| Ammonium persulfate | 0.15 |
| Sodium acetate | 0.15 |
| Polyvinyl alcohol | 4.5 |
| Water | 90 | was prepared as follows:

A reaction vessel fitted with a water-cooled condenser, stirrer, and gas inlet tube was charged with the water, ammonium persulfate, sodium acetate, polyvinyl alcohol, and about one-third of the acrylonitrile, butyl acrylate, and N-methylol acrylamide. This mixture was heated, with stirring, to about 167° F. while a stream of nitrogen was slowly bubbled through the solution. When the temperature of the mixture had reached 167° F., the remaining two-thirds of the acrylonitrile, butyl acrylate, and N-methylol acrylamide was added uniformly thereto over a 3-hour period. After all of the monomers had been added, the mixture was heated to a temperature of 203° F. and maintained at this temperature for about 15 minutes, at the end of which time the mixture was allowed to cool to room temperature and discharged from the reaction vessel.

The copolymer emulsion thus prepared was deposited upon a fabric substrate carried on a conveyor blanket in a wet coat thickness of 15 mils. Rayon fibers 0.05 inch in length and 1.5 denier in diameter were then flocked upon the wet adhesive layer with constant agitation due to the action of beater bars upon the conveyor blanket. The wet flocked surface was then passed into a hot air oven wherein it was heated at a temperature of 300° F. for about 5 minutes. The resulting flocked fabric, when subjected to the tests heretofore described, exhibited properties of wash, dry clean, and abrasion resistance which were superior to the properties exhibited by flocked fabrics employing conventional flocking adhesives.

Example II

This example further illustrates the preparation of the adhesive compositions of this invention.

The general procedure described in Example I was employed to prepare the compositions presented in the table below.

| Components | Formulation Number | | | | | | | | | | |
|---|---|---|---|---|---|---|---|---|---|---|---|
| | 1 | 2 | 3 | 4 | 5 | 6 | 7 | 8 | 9 | 10 | 11 |
| Acrylonitrile | 5 | 40 | 14.5 | 14.5 | 40 | 5 | 20 | 20 | 25 | 25 | 25 |
| Butyl acrylate | 90 | 55 | 85 | 75.5 | 55 | 90 | | | | | |
| Methyl acrylate | | | | | | | 75 | | | | |
| 2-ethyl hexylacrylate | | | | | | | | 75 | 70 | 70 | 70 |
| Glycidyl acrylate | | | | | | | | | 5 | | |
| Glycidyl methacrylate | | | | | | | | | | 5 | |
| N-methylol acrylamide | 5 | 5 | 0.5 | 10 | 5 | 5 | 5 | 5 | | | |
| N-methylol methacrylamide | | | | | | | | | | | 5 |
| Benzoyl peroxide | 0.75 | 0.75 | 0.75 | 0.75 | 0.75 | 0.75 | 0.75 | 0.75 | 0.75 | 0.75 | 0.75 |
| Isopropyl alcohol | 22 | 22 | 22 | 22 | 22 | 22 | 22 | 22 | 22 | 22 | 22 |
| Methyl alcohol | 18 | 18 | 18 | 18 | 18 | 18 | 18 | 18 | 18 | 18 | 18 |
| Toluene | 60 | 60 | 60 | 60 | 60 | 60 | 60 | 60 | 60 | 60 | 60 |
| Para-toluenesulfonic acid | 0.25 | 0.25 | | | | | | | 0.25 | | |

The compositions listed above, when used as adhesives in flock printing processes, yielded flocked fabrics which, when subjected to the tests described in Example I, exhibited properties of wash, dry clean, and abrasion resistance which were superior to the properties exhibited by flocked fabrics employing conventional flocking adhesives.

Summarizing, the adhesive compositions of this invention, when employed as binders for flocked fabrics, impart to the finished fabrics remarkably favorable properties of wash, dry clean, and abrasion resistance. Moreover, flocked fabrics wherein these adhesive compositions are utilized are especially characterized by flexibility and soft hand. The adhesive compositions of this invention also are commercially significant in that they can be cured very rapidly at elevated temperatures or even at room temperature if so desired.

Any departure from the above description which conforms to this invention is intended to be included within the scope of the invention as defined by the following claims.

We claim:

1. In the method of flock printing which comprises applying an adhesive composition to a substrate, depositing fibers on said adhesive coated substrate, curing said adhesive coated substrate, and thereafter removing excess fibers, the improvement which comprises employing as the adhesive composition therein an organic solvent solution of a copolymer consisting of from 5 to 40%, by weight, of acrylonitrile, from 0.5 to 10%, by weight, of a crosslinking comonomer selected from the group consisting of glycidyl acrylate and glycidyl methacrylate, and from 55 to 90%, by weight, of an alkyl ester of acrylic acid wherein said alkyl group contains from 1 to 8 carbon atoms; said organic solvent solution being entirely devoid of any other polymeric ingredients.

2. In the method of flock printing which comprises applying an adhesive composition to a substrate, depositing fibers on said adhesive coated substrate, curing said adhesive coated substrate, and thereafter removing excess fibers, the improvement which comprises employing as the adhesive composition therein about 0.25%, by weight, of para-toluenesulfonic acid, and about 99.75%, by weight, of an organic solvent solution of a copolymer consisting of from 5 to 40%, by weight, of acrylonitrile, from 0.5 to 10%, by weight, of a crosslinking comonomer selected from the group consisting of glycidyl acrylate and glycidyl methacrylate, and from 55 to 90%, by weight, of an alkyl ester of acrylic acid wherein said alkyl group contains from 1 to 8 carbon atoms; said organic solvent solution being entirely devoid of any other polymeric ingredients.

3. A flocked fabric comprising a substrate fabric to which flock fibers are adhesively bonded with the dried residue of an organic solvent solution of a copolymer consisting of from 5 to 40%, by weight, of acrylonitrile, from 0.5 to 10%, by weight, of a crosslinking comonomer selected from the group consisting of glycidyl acrylate and glycidyl methacrylate, and from 55 to 90%, by weight, of an alkyl ester of acrylic acid wherein said alkyl group contains from 1 to 8 carbon atoms; said organic solvent solution being entirely devoid of any other polymeric ingredients.

References Cited
UNITED STATES PATENTS

| | | | |
|---|---|---|---|
| 2,310,965 | 2/1943 | Leavy et al. | 117—25 |
| 2,881,087 | 4/1959 | Schwartz et al. | 117—25 X |
| 2,976,167 | 3/1961 | Maeder et al. | 117—33 |
| 2,994,676 | 8/1961 | Kucsan et al. | 260—80.5 |
| 3,099,514 | 7/1963 | Haber | 117—33 X |
| 3,117,108 | 1/1964 | Calvete | 260—80.5 |
| 3,231,533 | 1/1966 | Garrett et al. | 260—29.6 |

WILLIAM D. MARTIN, *Primary Examiner.*

MURRAY TILLMAN, *Examiner.*

J. ZIEGLER, W. D. HERRICK, *Assistant Examiners.*